No. 722,153. PATENTED MAR. 3, 1903.
M. A. SHAUMAN.
STEAMER FOR CULINARY PURPOSES.
APPLICATION FILED MAR. 22, 1902.
NO MODEL.
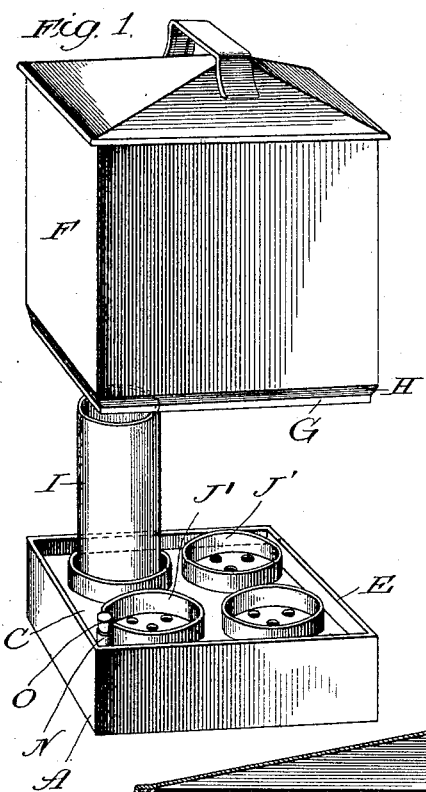
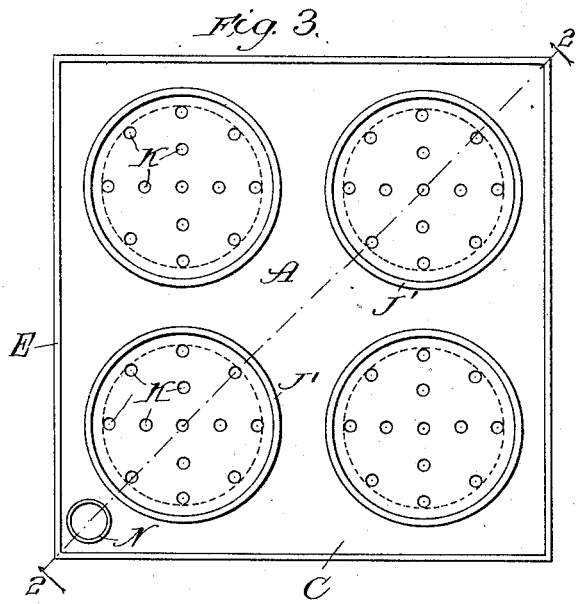
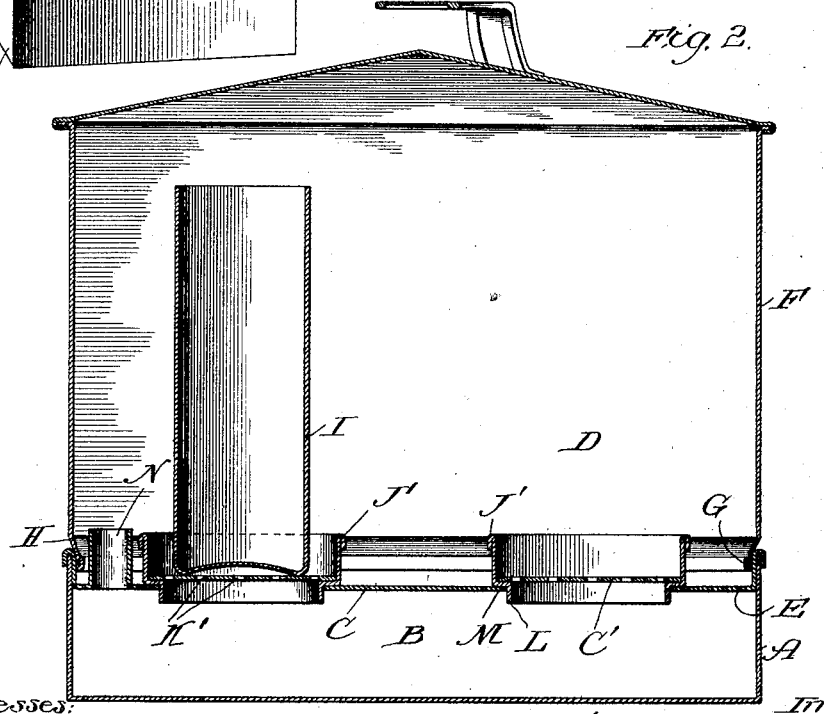

UNITED STATES PATENT OFFICE.

MARY A. SHAUMAN, OF BENTON HARBOR, MICHIGAN.

STEAMER FOR CULINARY PURPOSES.

SPECIFICATION forming part of Letters Patent No. 722,153, dated March 3, 1903.

Application filed March 22, 1902. Serial No. 99,527. (No model.)

*To all whom it may concern:*

Be it known that I, MARY A. SHAUMAN, a citizen of the United States, residing at Benton Harbor, in the county of Berrien and State of Michigan, have invented certain new and useful Improvements in Steamers for Culinary Purposes, of which the following is a specification.

The present invention relates to a steamer that may be used in a number of different ways for cooking a variety of articles of food, but which is particularly adapted for cooking fruit after it is put in the jars, cans, or other vessels in which it is to be preserved for future use. Cooking the fruit in these preserving vessels has many advantages over cooking it in bulk in a kettle or the like and then when the cooking is complete filling the preserving vessels with it. The principal advantage is that the breaking of the fruit incident to handling it after it has been softened in the process of cooking is entirely obviated. Plums, damsons, cherries, apricots, peaches, &c., may be preserved whole and with the skin on without even breaking the skin, and other fruits from which the skin has been removed may be cooked whole or in halves or other large pieces without being broken. When thus kept intact, the preserved fruit is very much more attractive in appearance than it would be if broken and marred. Another advantage in cooking the fruit in the preserving vessels is that it is very much easier to fill the vessels with the raw fruit than it is to fill them with the cooked fruit while it is boiling hot, and the besmearing of the preserving vessels, the stove, the table, &c., incident to the latter process is obviated. Furthermore, it obviates the danger of overcooking incident to allowing the large kettle to remain on the stove while the preserving vessels are being filled from it or the danger of its cooling before the entire batch can be put into the preserving vessels and sealed if the kettle is removed from the stove the instant the cooking is completed. Then, again, after the cooking is completed the comparatively small preserving vessels containing it can be handled with less liability to accident than can a large kettle. Still another advantage is that much of the flavor which is lost when the fruit is cooked in a large kettle is retained when it is cooked in the preserving vessels.

With these things in view the object of my present invention is to provide a steamer in which the fruit can be cooked in the preserving vessels. To this end I construct the steamer with a chamber adapted to contain water and in which the steam is generated, a steam-chamber into which the steam rises from the generating-chamber, a diaphragm which forms the bottom of the steam-chamber and the top of the water-chamber, said diaphragm having through it an opening adapted to receive an inwardly-offset flange of a ring having a shoulder which rests upon the diaphragm, and a perforated disk located within the ring and supported by said shoulder, the arrangement being such that when parts are assembled the ring will constitute a flange projecting upward from the diaphragm which will confine the steam to close contact with the bottom and sides of the preserving vessel after it enters the steam-chamber and while it is at the highest temperature. This is important, as it expedites the cooking, and this is desirable not only from the standpoint of economy of time and fuel, but also because perfection in preserving some fruits requires that they be cooked quickly.

The invention consists in the features of novelty that are herein described.

In the accompanying drawings, which are made a part hereof, Figure 1 is a perspective view of the improved steamer with the dome of the steam-chamber elevated. Fig. 2 is a vertical section thereof, taken in a plane extending diagonally from corner to corner. Fig. 3 is a plan view of the base.

A represents the base, which is adapted to rest upon the stove and which has a chamber B, adapted to contain water, and C is the diaphragm, which forms the bottom of the steam-chamber D and which preferably is permanently secured to the walls of the base some distance from the top, so that a portion E of said base in the nature of a flange projects above it. This flange forms the lower portion of the walls of the steam-chamber D and also forms a seat for the removable dome F, which completes the steam-chamber. The dome has imperforate top and side walls, and at the bottom the side walls are offset inwardly to provide a flange G, which slips inside of the flange E, and a shoulder H, which seats upon the flange E, thereby forming a practically steam-tight joint. The advantage in having the flange G inside of the flange E is that water of condensation trickling down the walls of the dome will run into the base and not onto the stove, as some of it would if the flange E were inside.

It is immaterial what the size of the steamer is or how many preserving vessels it has provision for. In the drawings I have shown a steamer having provision for four vessels, one of which is shown at I. For each vessel a ring J' is provided, said ring being formed with an inwardly-offset flange L, which enters an opening of corresponding size in the diaphragm C, so that the ring is removable. The offset of the ring results in a shoulder M, which rests upon the diaphragm and which in turn supports a disk C', having through it perforations K' for permitting steam to pass upward and in contact with the vessel. The advantage of this removable ring carrying the perforated disk is that it gives access to the water-chamber for cleaning purposes, and in addition to this the large opening through the diaphragm affords means for quickly filling said chamber. I prefer, however, to provide the chamber with a filling-tube N, which is permanently secured in an opening through the diaphragm and which is closed by a suitable stopper O.

When it is not desirable or necessary to use the steamer as above described, it may be used as other culinary steamers are used. The food to be cooked may be placed in the steam-chamber either loose or in suitable vessels or other containing devices without regard to the described use of the flanges.

Having thus described my invention, the following is what I claim as new therein and desire to secure by Letters Patent:

A culinary steamer having, in combination a steam-chamber and a water-chamber including a diaphragm which forms the bottom of one and the top of the other, said diaphragm having through it an opening, a ring having an inwardly-offset portion resulting in a flange occupying the opening of the diaphragm and a shoulder resting upon the diaphragm, and a perforated disk arranged within the ring and supported by the shoulder aforesaid, whereby when the parts are assembled the ring will form a flange rising from the diaphragm and adapted to surround a containing vessel, substantially as described.

MARY A. SHAUMAN.

Witnesses:
ANNA R. MORLEY,
JOHN H. HERR.